United States Patent [19]

Lawson, Jr.

[11] Patent Number: 5,440,736
[45] Date of Patent: Aug. 8, 1995

[54] SORTER FOR RECORDS HAVING DIFFERENT AMOUNTS OF DATA

[75] Inventor: John R. Lawson, Jr., Teller County, Colo.

[73] Assignee: Digital Equipment Corporation, Maynard, Mass.

[21] Appl. No.: 157,864

[22] Filed: Nov. 24, 1993

[51] Int. Cl.$^6$ .............................................. G06F 17/30
[52] U.S. Cl. .................................... 395/600; 395/800; 364/DIG. 1; 364/222.9
[58] Field of Search ............................... 395/600, 800

[56] References Cited

U.S. PATENT DOCUMENTS

| 4,078,260 | 3/1978 | Chen et al. | 395/800 |
| 4,520,456 | 5/1985 | Miranker et al. | 395/800 |
| 4,575,798 | 3/1986 | Lindstrom et al. | 395/600 |
| 4,809,158 | 2/1989 | McCauley | 395/600 |
| 5,084,815 | 1/1992 | Mazzario | 395/800 |
| 5,146,590 | 9/1992 | Lorie et al. | 395/600 |
| 5,179,699 | 1/1993 | Iyer et al. | 395/650 |
| 5,206,947 | 4/1993 | Edem et al. | 395/600 |

Primary Examiner—Thomas G. Black
Assistant Examiner—Wayne Amsbury
Attorney, Agent, or Firm—Dirk Brinkman; Ronald C. Hudgens; Arthur W. Fisher

[57] ABSTRACT

Prior to sorting, the amount of data in each record of a collection of records is normalized to a value chosen from a designated set of values. The designated set of values selected from a progression of numbers computed as an integer power of two. The normalized collection is partitioned into a plurality of sub-sets of records to be sorted in parallel. Sorted sub-sets of records are merged to arrange the records in a predetermined order.

11 Claims, 3 Drawing Sheets

SORTER FOR RECORDS HAVING DIFFERENT AMOUNTS OF DATA

FIELD OF THE INVENTION

The present invention relates generally to computer systems, and more particularly to a method and apparatus to sort records in a computer system.

BACKGROUND OF THE INVENTION

In computer systems, where data are frequently organized into collections of records, it has been estimated that over one quarter of the system resources are consumed to sort the records of the collections. Consumed resources include time and space. Rearranging records within computer systems is a tedious process performed by numerous, and often inefficient steps.

It is well known that sorting records is more efficient in time if the records all have the same amount of data. If the records have the same amount of data, the location of successive records can easily be computed, and out-of-sequence records can be rearranged without shifting intervening records. However, in many collections of records, the records include different amounts of data. To gain time efficiencies, some prior art solutions have equalized the amount of data in the records before sorting.

Equalization is inefficient if the amount of data in a few large records is substantially greater than the amount of data in many small records. A large quantity of space is wasted to store records, particularly all but the largest records of the collection. The records having less data could otherwise have been stored in a substantially smaller amount of space.

The costs associated with equalization can be offset by using low-cost bulk storage devices, such as disks, to store the records while they are sorted. Unfortunately, disks generally have longer access latencies than more expensive but faster semiconductor storage devices.

It is a goal of the invention to enable records having different amounts of data to be sorted without wasting a considerable amount of storage space. It is also a goal of the invention to sort the records in less time.

SUMMARY OF THE INVENTION

The present invention is directed to a method and apparatus for efficiently sorting a collection of records, the records having different amounts of data. Prior to sorting, the amount of data in each record of the collection is normalized to a value chosen from a designated set of values. The designated set of values is selected from a progression of numbers computed as an integer power of two.

The normalized collection of records is partitioned into a plurality of sub-sets of records. Each one of the sub-sets of records includes records having the same amount of data. The sub-sets of records are sorted in parallel, and merged to arrange the records in a predetermined order.

In alternative embodiments of the invention, the designated set of values is selected from a series of numbers having a Poisson distribution. Additionally, a particular sub-set having a large number of records can be partitioned into multiple sub-sets to increase parallelism.

DETAILED DESCRIPTION OF A PREFERRED EMBODIMENT

Figure 1:
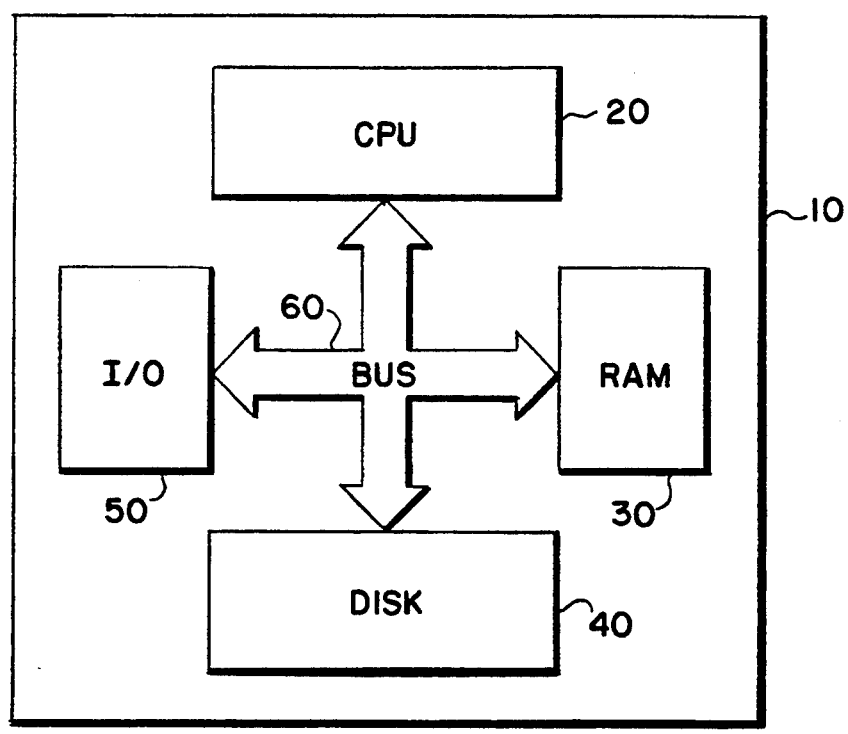
FIG. 1 is a block diagram of a computer system which can use the invention.

FIG. 1 shows a computer system 10 comprising structures and processes in accordance with the principles of the invention. The computer system 10 is of the type which can include a central processor unit (CPU) 20, a fast local memory (RAM) 30, a slower bulk memory (DISK) 40, and an I/O sub-system (I/O) 50. The CPU 20, RAM 30, DISK 40, and I/O 50 are connected to each other by a data communications bus (BUS) 60. During operation of the computer system 10, data are transferred between the RAM 30, the DISK 40, and the I/O 50, via the BUS 60, for processing by the CPU 20.

In the computer system 10, related data are frequently organized into a collection of records. It is a problem to sort the records of the collection efficiently. It is a particular problem if the various records contain different amounts of data.

Figure 2:
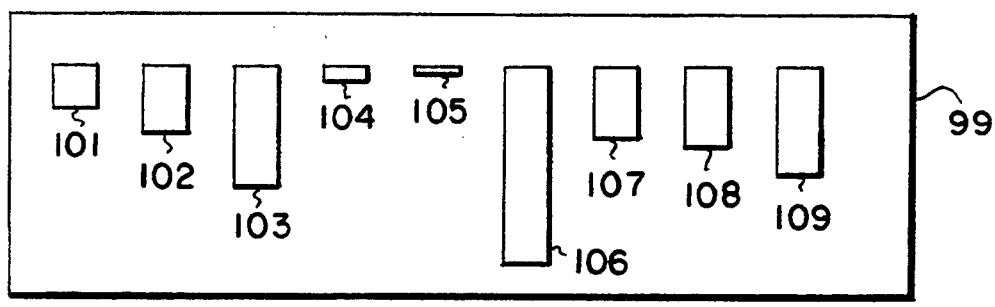
FIG. 2 is a block diagram of an exemplary collection of records to be sorted by the computer system of FIG. 1.

FIG. 2 shows a collection 99 of data representing information to be sorted by the CPU 20. While being sorted, the collection 99 can be stored in the RAM 30 and the DISK 40. Alternatively, the collection can be stored in another computer system connected to the I/O 50 by a communications network. Storing the collection 99 in the DISK 40, as opposed to the RAM 30, reduces storage cost at the expense of processing time, time is lost due to inherent latencies in the DISK 40 which are difficult to eliminate.

The collection 99 includes a plurality of records 101–109. The amount of data in each of the records 101–109 can be measured by the number of bytes consumed by the data of the records 101–109. Each byte contains data representing, for example, letters and numbers of the information to be sorted. The number of bytes in each of the records 101–109 may be unpredictably distributed over a larger range of values. Additionally, the number of records in any one collection can also be distributed over a wide range of values.

Therefore, in accordance with the principles of the invention, the number of bytes in each of the records 101–109 is normalized to a value chosen from a designated set of values to increase space efficiencies. The designated set of values may be chosen in several ways. In a preferred embodiment, the designated set of values is selected from a progression of numbers computed as an integer power of two. More particularly, the amount of data in a particular record is normalized to a value which is at least as large as the number of bytes in the record, and which can also be expressed as $2^n$, where n is an integer.

Figure 3:
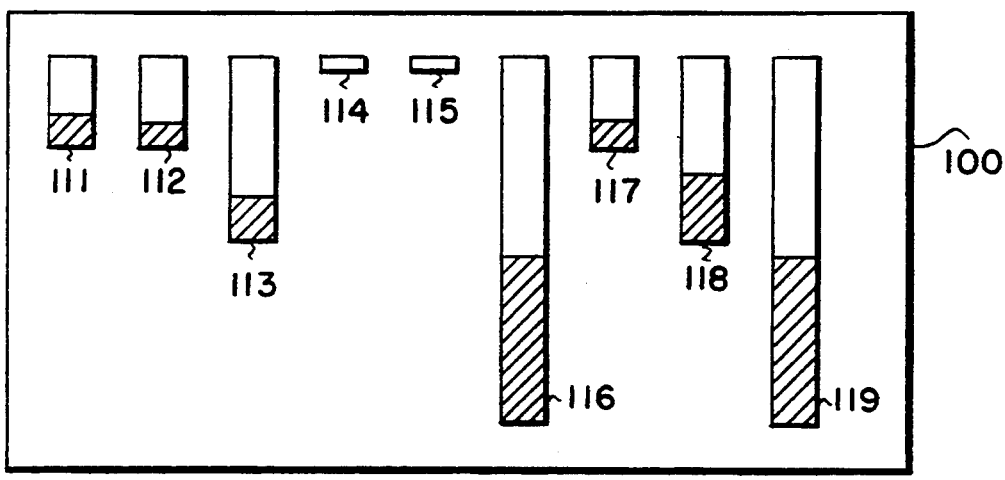
FIG. 3 is a block diagram of the collection of records of FIG. 2 after normalization.
Figure 4:
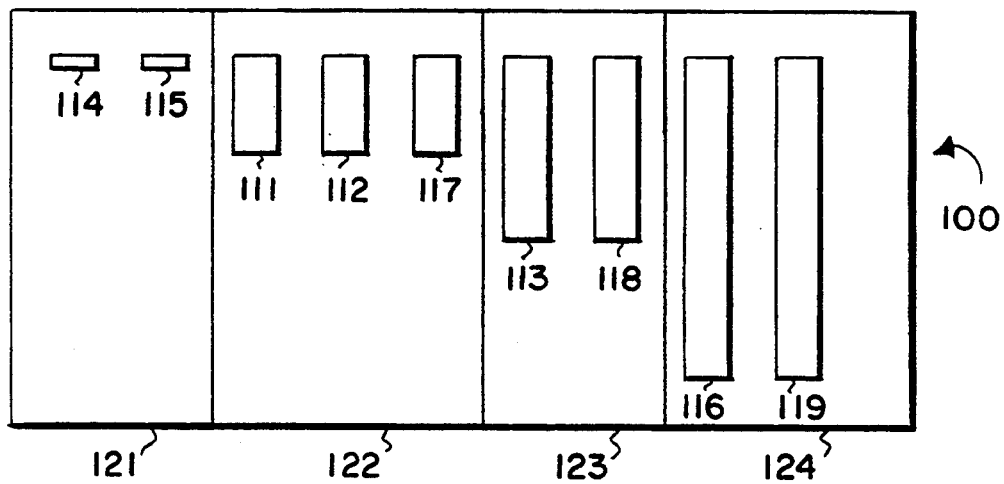
FIG. 4 is a block diagram the normalized collection of records of FIG. 3 partitioned into sub-sets of records.

Using a corresponding normalized collection 100 as shown in FIG. 3 as an example, if record 101 of FIG. 2 originally contained eleven bytes of data, the normalized record 111 of FIG. 4 has sixteen bytes. Record 115 retains the original amount of data if the corresponding unnormalized record 105 contained four or $2^2$ bytes. The bytes used to normalize the records 111-119 can be appended to the end of the records 101-109 as null bytes so that the sorted order of the records is not affected. The null bytes are shown as cross-hatching in FIG. 3.

Furthermore, to gain time efficiencies, in the preferred embodiment of the invention, the normalized collection 100 is partitioned into a plurality of sub-sets of records. Each sub-set of records only contains records having the same amount of data.

FIG. 4 shows the collection 100 partitioned into a plurality of sub-sets 121-123. The records 114 and 115 of sub-set 121 each contain, for example, four bytes. The records 111, 112, and 117 of sub-set 122 each contain sixteen bytes, and so forth.

The subsets of normalized records can then by sorted. Further time reductions can be gained if the sub-sets 121-124 are sorted in parallel. After sorting, the records of the sorted sub-sets are merged to reconstruct the entire collection now arranged into a desired sequence.

Figure 5:
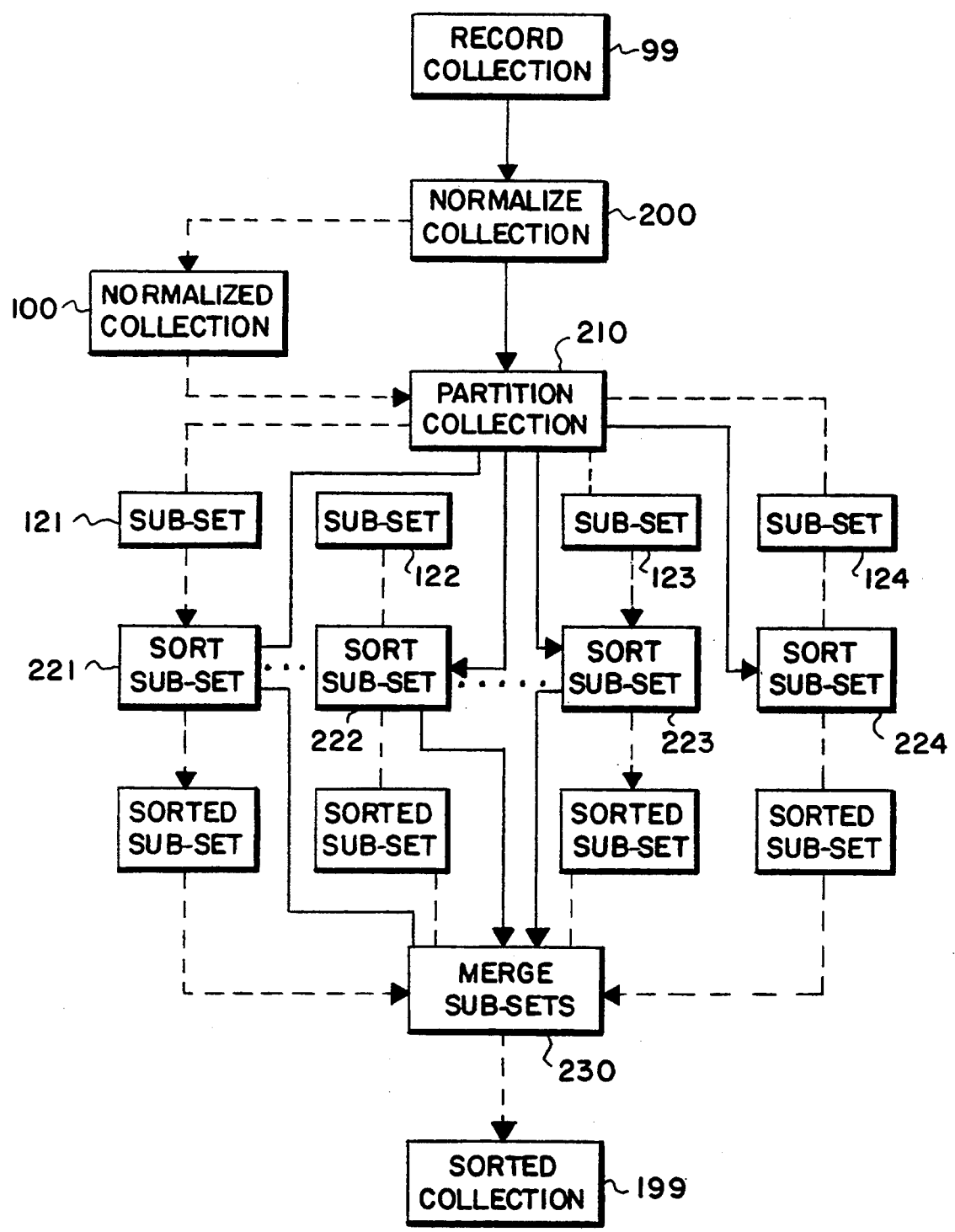
FIG. 5 is a flow diagram of the steps of a preferred sorting method in accordance with the invention.

FIG. 5 shows the method steps of the preferred embodiment of the invention which can be used to sort the collection 99 having records 101-109.

Step 200 receives as an input the collection 99 having records 101-109, the records having different amounts of data. In step 200, the records 101-109 are normalized as described above. The normalized size of each record is chosen from a designated set of values as described above. Step 200 produces as an output the normalized collection 100.

If the designated set of values is selected from a progression of numbers computed as an integer power of two, a number of advantages are gained. The normalized size of each record can rapidly be determined by simple, and fast-to-execute bit operations. The selected values are distributed over a wide range. The incremental difference between successive selected sizes is relatively small for smaller values to improve the fit of a collection where the number of small records is quite large, and the number of large records is small. For example, the records can be 4, 8, 16, 32, 64, or 65,532 bytes. Storage space in many computer systems is frequently allocated in quantities which are expressed as an integer power of two. Therefore, the normalized records are easily accommodated in storage devices.

The normalized collection 100 is provided to step 210. In step 210, the collection 100 is partitioned into a plurality of sub-sets of records, each sub-set 121-124 having records which contain the same amount of data, for example, 4, 16, 32 and 64, bytes respectively.

In steps 221-224, each of the sub-sets 121-124 is sorted, preferably in parallel. The steps of the sorting methods may be optimized for a particular sub-set having records of a particular size. For example, sub-sets having smaller sized records, of which there may be many, may sorted more efficiently if they are stored in the RAM 30 during sorting. Sub-sets having, perhaps, fewer larger sized records can sometimes be sorted more economically if they are stored in the disk 40.

In step 230, the sorted sub-sets 121-124 are merged. During merging, records are sequentially selected from each of the sub-sets to arrange the output collection 199 in a desired order. In the preferred embodiment, to further increase time efficiencies, the merging step 230 may overlap the sorting steps 221-224. As soon as each of the sorting steps 221-224 have produced at least one sorted record as an output, the sorted records can be merged. Merging can continue in parallel while successive records are presented at the output of the sorting steps 221-224.

It should also be noted, that merging can also be performed in parallel if a tiered merge is used. In a tiered merge, records are merged from pairs of input streams, the merged output streams are then further merged in pairs until reduced to a single merged record stream. For example, if there are originally four sorted sub-sets 121-124, during a first merge subsets 121 and 122 are merged in parallel with sub-sets 123 and 124. Then the resulting merged sub-sets are merged with each other.

In an alternative embodiment of the invention, the amount of data in each record may be chosen from a designated set of values approximating the distribution of sizes of the records of the collection. For example, the designated set of values may be selected from a series numbers having a Poisson distribution. The Poisson distribution can, for example, be maintained as a table of numbers in the RAM 30. Or, the designated set of values can be selected from the well-known Fibonacci series.

In another embodiment of the invention, the collection of records can be partitioned so that multiple sub-sets all have records of the same size. Thus, should the collection of records have many records clustered around a single normalized size, these records can be sorted in parallel by distributing them over multiple sub-sets. This increases the likelihood that all sub-sets will complete sorting substantially concurrently. And, alternatively, sub-sets of records only having a small number of records can be subsumed into a single sub-set to decrease the number of parallel sorting operation in progress at any one time.

Using the above described preferred embodiment of the invention, a collection of records having about 16,000 records, ranging in size from 32 bytes to 45,000 bytes, was sorted in about five seconds. Sorting the same collection using prior art sorting techniques took about twenty-minutes.

Although the foregoing has described preferred embodiments of the invention, those skilled in the art will recognize that changes to these embodiments can be made without departing from the principles of the invention, the scope of which are defined in the appended claims.

What is claimed is:

1. In a computer system, a method for sorting a collection of records, the records of the collection having different amounts of data, comprising the steps of:
   normalizing the amount of data in each record to a value chosen from a designated set of values, the designated set of values selected from a progression of numbers;
   partitioning the normalized records into a plurality of sub-sets of records, each of the partitioned sub-sets of records including records having the same amount of data;
   sorting each sub-set of records; and
   merging each sorted sub-set of records to arrange the records in a predetermined order.

2. The method is in claim 1 wherein the progression of numbers is selected to be an integer power of two.

3. The method as in claim 2 where the progression of numbers is selected from the sequence of Fibonnaci numbers.

4. The method as in claim 1 wherein the progression of numbers is selected to have a Poisson distribution.

5. The method as in claim 1 wherein the sorting of the plurality of sub-sets of records is performed in parallel.

6. The method as in claim 5 further including the step of partitioning a particular sub-set of records into multiple sub-sets of records if the particular sub-set of records includes a number of records which is substantially larger than any other sub-sets.

7. The method as in claim 6 further including the step of subsuming multiple sub-sets into a single subsets if said multiple sub-sets include a number of records which is substantially smaller than any other sub-sets.

8. The method as in claim 1 wherein the steps of sorting and merging are performed partially in parallel.

9. A method for sorting a collection of records stored in a computer system, the records of the collection having different amounts of data, comprising the steps of:

> normalizing the amount of data in each record of the collection to a value chosen from a designated set of values, the designated set of values selected from a progression of numbers computed as an integer power of two;
>
> partitioning the normalized records into a plurality of sub-sets of records, each of the partitioned sub-sets of records including records having the same amount of data;
>
> sorting each sub-set of records in parallel; and
>
> merging each sorted sub-set of records to arrange the records in a predetermined order.

10. A sorter for sorting a collection of records having different amounts of data, comprising:

> means for normalizing the amount of data in each record to a value chosen from a designated set of values, the designated set of values selected from a progression of numbers;
>
> means for partitioning the normalized records into a plurality of sub-sets of records, each of the partitioned sub-sets of records including records having the same amount of data;
>
> means for sorting each sub-set of records in parallel; and
>
> means for merging each sorted sub-set of records to arrange the records in a predetermined order.

11. The sorter as in claim 10 wherein the progression of numbers is selected to be an integer power of two.

* * * * *